United States Patent
Mai-Krist

(10) Patent No.: US 10,175,809 B2
(45) Date of Patent: Jan. 8, 2019

(54) VEHICLE ELECTRONIC MOBILE DEVICE SYSTEMS

(71) Applicant: Toyota Motor Engineering & Manufacturing North America, Inc., Erlanger, KY (US)

(72) Inventor: Ida T Mai-Krist, White Lake, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 211 days.

(21) Appl. No.: 15/177,913

(22) Filed: Jun. 9, 2016

(65) Prior Publication Data

US 2017/0357359 A1    Dec. 14, 2017

(51) Int. Cl.
| | |
|---|---|
| *H04M 1/725* | (2006.01) |
| *G06F 3/041* | (2006.01) |
| *G06F 3/0481* | (2013.01) |
| *G06F 3/0488* | (2013.01) |
| *G09G 5/12* | (2006.01) |
| *H04M 1/60* | (2006.01) |

(52) U.S. Cl.
CPC .......... *G06F 3/0416* (2013.01); *G06F 3/0481* (2013.01); *G06F 3/0488* (2013.01); *G09G 5/12* (2013.01); *H04M 1/6075* (2013.01); *H04M 1/7253* (2013.01); *H04M 1/72541* (2013.01); *G09G 2380/10* (2013.01); *H04M 1/72552* (2013.01); *H04M 2201/40* (2013.01)

(58) Field of Classification Search
CPC .... G06F 3/0416; G06F 3/0481; G06F 3/0488; G09G 2380/10; G09G 5/12; H04M 1/6075; H04M 1/7253; H04M 1/72541; H04M 1/72552; H04M 2201/40
See application file for complete search history.

(56) References Cited

U.S. PATENT DOCUMENTS

| | | | |
|---|---|---|---|
| 6,697,638 | B1 | 2/2004 | Larsson et al. |
| 8,712,429 | B2 | 4/2014 | Nagorniak |
| 8,825,032 | B1 | 9/2014 | Jones et al. |
| 8,874,104 | B1 | 10/2014 | Cope et al. |
| 9,019,068 | B2 | 4/2015 | Varoglu |
| 2005/0277445 | A1 | 12/2005 | Bae |

(Continued)

FOREIGN PATENT DOCUMENTS

WO    2006/067541 A1    6/2006

*Primary Examiner* — Hong Zhou
(74) *Attorney, Agent, or Firm* — Dinsmore & Shohl LLP

(57) ABSTRACT

The vehicle electronic mobile device system includes an executable software program configured to lock down the tactile input of the electronic mobile device when the electronic mobile device is paired and the vehicle is in a vehicle operating condition. The vehicle electronic mobile device system includes a hands-free system. The executable software program is further configured to allow other functions of the electronic mobile device remain operative and incoming texts and phone calls are pushed through the hands-free system. Responses to the incoming texts and phone calls are transmitted from the driver to the electronic mobile device through the hands-free system. Accordingly, the vehicle electronic mobile device system discourages users from handling the electronic mobile device but allows the driver to maintain communications through the electronic mobile device by utilizing the hands-free system.

18 Claims, 3 Drawing Sheets

(56) References Cited

U.S. PATENT DOCUMENTS

| | | | |
|---|---|---|---|
| 2011/0053506 A1* | 3/2011 | Lemke | H04M 1/6075 |
| | | | 455/41.2 |
| 2012/0166788 A1* | 6/2012 | Racha | H04M 1/72577 |
| | | | 713/100 |
| 2013/0035117 A1* | 2/2013 | Litkouhi | H04L 67/12 |
| | | | 455/456.4 |
| 2013/0157640 A1 | 6/2013 | Aycock | |
| 2013/0295908 A1 | 11/2013 | Zeinstra et al. | |
| 2013/0295910 A1* | 11/2013 | Enty | H04W 8/22 |
| | | | 455/419 |
| 2013/0303143 A1* | 11/2013 | Schrader | H04W 12/08 |
| | | | 455/418 |

* cited by examiner

VEHICLE ELECTRONIC MOBILE DEVICE SYSTEMS

TECHNICAL FIELD

The present specification generally relates to vehicle electronic mobile device systems configured to maintain driver awareness when the electronic mobile device is paired to the wireless network of the automotive vehicle.

BACKGROUND

Hands-free communication systems provide operators of automotive vehicles with the ability to communicate through an electronic mobile device without actually physically handling the electronic mobile device. The electronic mobile device is paired with the automotive vehicle's wireless network. The hands-free communication system may include an input for receiving commands and a processing unit configured to transmit commands from the input to electronic mobile device through the wireless network.

The input may include a microphone and a tactile input such as a button disposed on the steering wheel. A speaker is used to provide notifications, relay conversations from callers and relay text messages received by the electronic mobile device. Accordingly, the hands-free communication system allows the user to keep his/her attention on the road while responding to text messages and electronic mobile device calls.

However, drivers may still handle the electronic mobile device 100 even though a hands-free communication system 200 is available, as shown in FIG. 1. The tactile input 110 of the electronic mobile device 100 is enabled while connected to the hands-free communication system 200. Thus, the user may opt to answer phone calls and text messages using the tactile input even though the hands-free communication system 200 is available.

There have been attempts made to disable the electronic mobile device or limit access to the electronic mobile device so as to force the driver to maintain awareness on the road. However, such attempts require the user to confirm use of the electronic mobile device by either having the electronic mobile device start the automotive vehicle or detecting the position of the electronic mobile device within the vehicle cabin. Such a confirmation may not ensure that the driver's electronic mobile device is the electronic mobile device being restricted.

Accordingly, a need exists for electronic mobile device systems that lock the electronic mobile device of the driver when the vehicle is in an operating condition so as to prevent the driver from handling the electronic mobile device, but allow the driver to receive and respond to electronic mobile device calls and text messages through the hands-free system.

SUMMARY

In one embodiment, a vehicle electronic mobile device system for promoting driver awareness for use in an automotive vehicle locks the tactile inputs of electronic mobile device when the electronic mobile device is paired to the automotive vehicle's wireless network. The vehicle electronic mobile device system includes a wireless network, a first wireless transceiver, a first computing device having a first processor and a hands-free system. The vehicle electronic mobile device system may further include an executable software program which may be downloaded onto the electronic mobile device as a condition for being paired to the wireless network.

The first wireless transceiver provides short range wireless communications. The first wireless transceiver may be a Bluetooth transceiver configured to store a plurality of profiles of electronic mobile devices. The Bluetooth transceiver transmits a pairing signal and any one of the electronic mobile devices. The electronic mobile device requesting access to the network may process the pairing signal so as to link the electronic mobile device to the wireless network through a pairing protocol. The linking of the electronic mobile device to the wireless network is commonly referred to as "pairing".

The electronic mobile device includes a second tactile input, a second wireless transceiver, an antenna and a second processor. The second tactile input may be a keyboard, a touchscreen display or a combination of both. The second processor is configured to processes the pairing signal which is received through the second wireless transceiver over the wireless network. The electronic mobile device and the vehicle electronic mobile device system initiate a pairing protocol so as to pair the electronic mobile device with the wireless network.

When the electronic mobile device is paired with the wireless network, the processor may transmit an executable software program to the electronic mobile device over the wireless network. The processor may be further configured to prevent the electronic mobile device from accessing the hands-free system until the electronic mobile device downloads and executes the executable software program. Once the executable software program is downloaded, the executable software program is further configured to determine or receive a vehicle operating condition.

The executable software program is configured to disable the second tactile input when the electronic mobile device is paired to the automotive vehicle and the automotive vehicle is in an operating condition. However, the executable software program is configured to permit the antenna, the second wireless transceiver and the second processor to continue operation. Thus, the electronic mobile device is able to send and receive data through the second wireless transceiver and the antenna. As such, communication with a cellular service and the driver is enabled through the hands-free system, but the tactile response through the tactile input of the electronic mobile device is rendered inoperable.

In one embodiment, the vehicle operating condition may be transmitted to the electronic mobile device over the wireless network. The first processor receives vehicle data from sensors and/or control units embedded in the vehicle. For instance an engine control unit may transmit to the first processor data indicating the state of the vehicle information. A body control unit may transmit to the first processor data indicating the state of the doors. The first processor processes such data to determine if the vehicle is in a vehicle operating condition.

In one embodiment, the vehicle operating condition may be determined by the second processor. The second processor receives vehicle data from sensors and/or control units embedded in the vehicle. The data is transmitted to the second processor over the wireless network. For instance an engine control unit may transmit data indicating the state of the vehicle information to the first processor. A body control unit may transmit to the first processor data indicating the state of the doors. The second processor processes such data to determine if the vehicle is in a vehicle operating condition.

Accordingly, the Accordingly, the vehicle electronic mobile device system discourages users from handling the electronic mobile device but allows the driver to maintain communications through the electronic mobile device by utilizing the hands-free system.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Referring generally to the figures, embodiments of the present disclosure are directed to vehicle electronic mobile device systems for use in an automotive vehicle configured to promote driver awareness. The vehicle electronic mobile device systems are configured to lock down, or disable, the tactile input of the electronic mobile device when the electronic mobile device is paired to the vehicle's wireless network.

The vehicle electronic mobile device system includes a hands-free communication system. The hands-free system includes audio and tactile inputs for receiving commands from the driver. The hands-free system further includes a speaker for providing audio communication from the mobile device. Accordingly, responding to phone calls and text messages from the driver may be accomplished without handling the electronic mobile device.

The vehicle electronic mobile device system may be further configured to lock down the tactile input of the electronic mobile device when the electronic mobile device is paired and the vehicle is in a vehicle operating condition. However, the hands-free system and the other functions of the electronic mobile device remain operative and incoming texts and phone calls are pushed through the hands-free system. Responses to the incoming texts and phone calls may only be accomplished through the hands-free system. Accordingly, the vehicle electronic mobile device system discourages users from handling the electronic mobile device but allows the driver to maintain communications through the electronic mobile device by utilizing the hands-free system.

Figure 1:
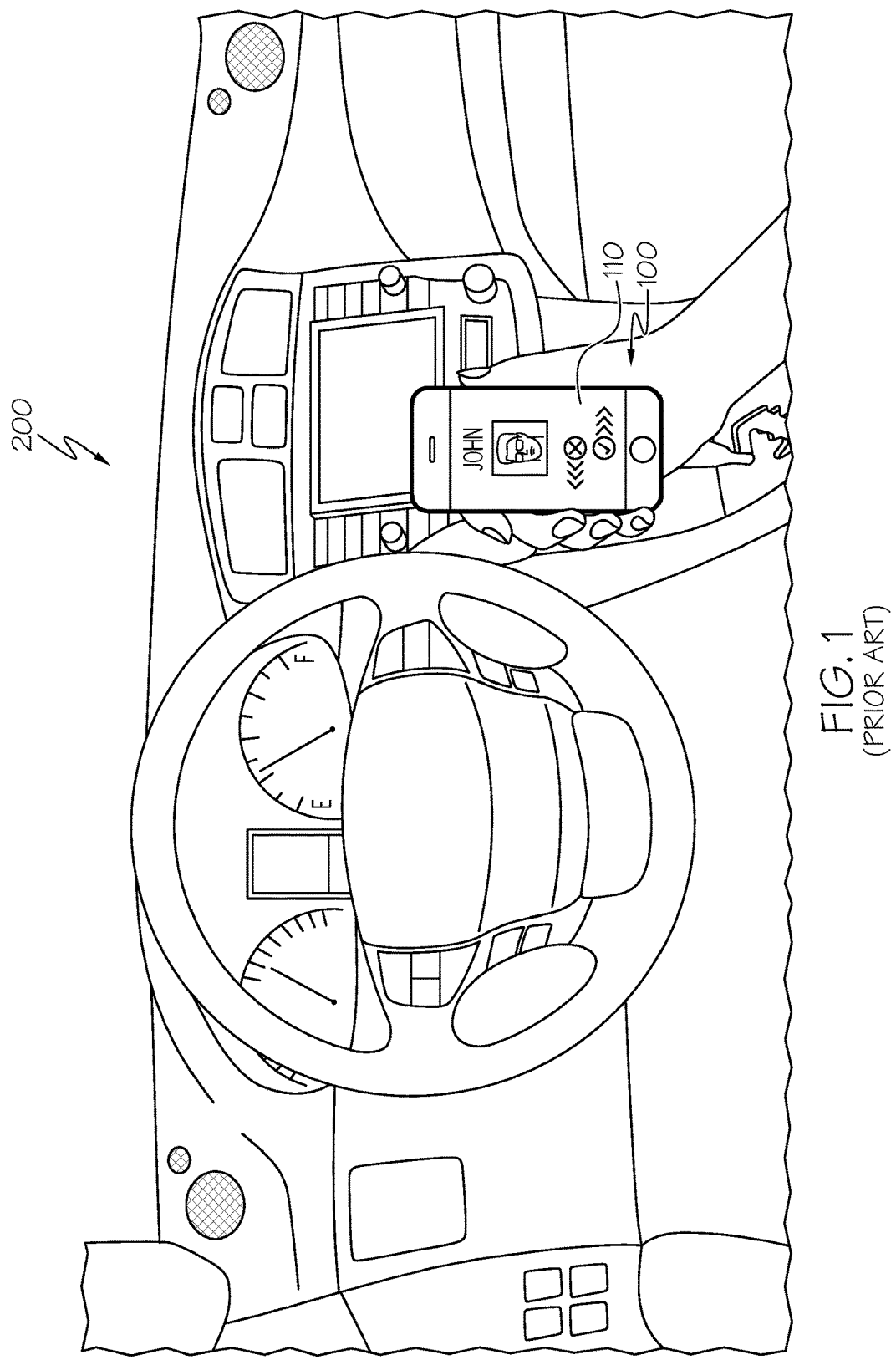
FIG. 1 schematically depicts a prior art hands-free system.
Figure 2:
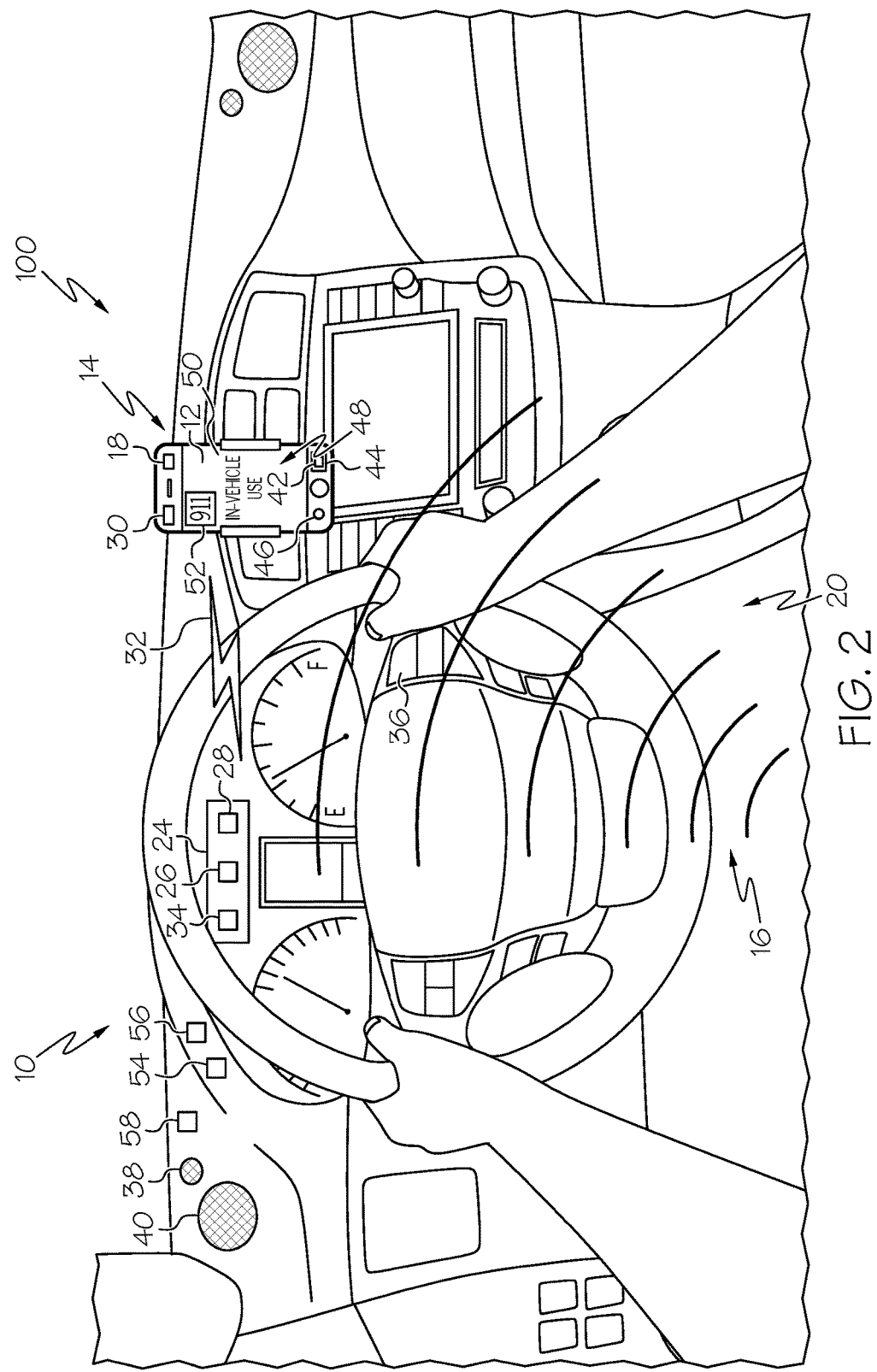
FIG. 2 schematically depicts an illustrative embodiment of the vehicle electronic mobile device system.

FIG. 2 depicts one embodiment of a vehicle electronic mobile device system 10 for promoting driver awareness for use in an automotive vehicle 100. A vehicle electronic mobile device system 10 locks a first tactile input 12 of an electronic mobile device 14 when the electronic mobile device 14 is paired to a wireless network 16 of the automotive vehicle 100. The electronic mobile device 14 may still function to receive and send data within the automotive vehicle 100 over the wireless network 16 and outside of the automotive vehicle 100 through an antenna 18 of the electronic mobile device 14. However, since the first tactile input 12 of the electronic mobile device 14 is locked, users are forced to respond to phone calls and text messages through a hands-free system 20. Accordingly, the vehicle electronic mobile device system 10 promotes driver awareness by preventing the electronic mobile device 14 from receiving commands through the first tactile input 12.

The vehicle electronic mobile device system 10 includes the wireless network 16, a first wireless transceiver 22, a first computing device 24 having a first processor 26 and the hands-free system 20. The first computing device 24 may reside locally within the automotive vehicle 100. The wireless network 16 is generally depicted by the waves shown emitting across the steering wheel. The vehicle electronic mobile device system 10 may further include an executable software program 28 that may be downloaded onto the electronic mobile device 14 as a condition for being paired to the wireless network 16.

The wireless network 16 is established by the pairing the first wireless transceiver 22 to a second wireless transceiver 30. The second wireless transceiver 30 is disposed in the electronic mobile device 14. The first wireless transceiver 22 is disposed within the automotive vehicle 100. The first processor 26 actuates the first wireless transceiver 22 so as to transmit a pairing signal 32.

The range of the first wireless transceiver 22 and the second wireless transceiver 30 may be up to 220 feet, and thus may allow electronic mobile devices outside of the automotive vehicle 100 cabin to be paired. The first wireless transceiver 22 and second transceiver are configured to carry data over a radio wave having a bandwidth generally between 2.4 to 2.485 GHz. For illustrative purposes, the first wireless transceiver 22 is shown as a Bluetooth transceiver, but it should be appreciated that other transceivers operating in short range distances may be adaptable for use herein.

The first processor 26 may be in communication with a data storage component 34 configured to store a plurality of profiles of electronic mobile devices 14. Each profile may be used to pair a corresponding electronic mobile device 14 to the first wireless transceiver 22. The pairing may be done by having the electronic mobile device 14 scan for the pairing signal 32, and selecting an option to pair the electronic mobile device 14 to the network. In some instances, pairing requires the electronic mobile device 14 to provide a password to authenticate access so as to prevent any electronic mobile device 14 from being paired with the network.

The hands-free system 20 is a system disposed within the automotive vehicle 100 which allows the driver to receive and respond to communications such as phone calls and text messages received by the electronic mobile device 14. The hands-free system 20 may include a second tactile input 36, a first microphone 38 and a first speaker 40. The second tactile input 36 is illustratively shown as a plurality of buttons disposed on the steering wheel of the automotive vehicle 100. However, it should be appreciated that the second tactile input 36 shown is provided for illustrative purposes and is not limiting to the scope of the appended claims. For instance, the tactile input may be disposed on the head unit of the automotive vehicle 100, or may be a joy stick, disposed on the steering wheel, or a rolling ball.

The hands-free system 20 is in communication with the first processor 26. The first processor 26 may be any processing component configured to receive and execute instructions. The first processor 26 may be disposed within the first computing device 24. The first processor 26 receives instructions, in data form, from the components of the hands-free system 20, such as the second tactile input 36, and the first microphone 38, and processes the instructions. The processed instructions are transmitted to the electronic mobile device 14 over the network. Likewise, the first processor 26 is configured to receive data transmitted by the electronic mobile device 14 over the network. For example, the first processor 26 may be configured to process the incoming phone call so as to play the phone call through the first speaker 40, or read the text messages through the first speaker 40.

The first microphone 38 is disposed on the instrument panel of the automotive vehicle 100 and is configured to pick up audible commands from the driver. The first microphone 38 is illustratively shown adjacent the first speaker 40. The first speaker 40 transmits in audible form communications received by the electronic mobile device 14. It should be appreciated that the hands-free system 20 is operable when the electronic mobile device 14 is paired to the network.

The electronic mobile device 14 includes the first tactile input 12, a second wireless transceiver 30, the antenna 18, a second processor 42, a second computing device 44 and a second speaker 46. The antenna 18 is configured to transmit and receive wireless information carried over a long range, typically line of sight distance. The antenna 18 is configured to carry data over radio waves operating in various frequencies approved by a governmental regulatory body and the commercial carrier. For instance, the antenna 18 may be configured for what is commonly known as LTE (4G) operations, wherein data is received and transmitted between 700 and 790 MHz.

The second wireless transceiver 30 is configured to link with the first wireless transceiver 22 and is illustratively shown as a Bluetooth transceiver. The second wireless transceiver 30 is disposed within the electronic mobile device 14.

The first tactile input 12 is configured to receive a physical input from the user and translate the input into a command. The first tactile input 12 is illustratively shown as a touch screen display. However, it should be appreciated that the first tactile input 12 may be a keyboard, or a touchscreen display and a keyboard. The first tactile input 12 shown herein is not limiting but provided for illustrative purposes.

The second processor 42 may be any processing component configured to receive and execute instructions. The second processor 42 may be disposed within the second computing device 44. The second computing device 44 may reside locally in the electronic mobile device 14. The second processor 42 receives instructions, in data form, from first tactile input 12, the antenna 18 and the second wireless transceiver 30 and processes the instructions. The second processor 42 processes the instructions to perform functionality of the electronic mobile device 14, including but not limited to displaying texts, playing phone calls, accepting phone calls, mapping and the like.

The second processor 42 is further configured to processes information received by the antenna 18 over the wireless network 16 to the hands-free system 20. Thus, phone calls or text messages received by the electronic mobile device 14 are carried over the network and played through the speakers of the hands-free system 20. Text messages received by the electronic mobile device 14 are also played through the speakers. The second processor 42 may be further configured to process the storage component of the electronic mobile device 14 so as to provide the driver with the name of the person who sent the text before reading the text through the speakers. For instance, the second processor 42 may communicate through the wireless network 16 that "A text is received from John Doe" before the hands-free system 20 reads the text.

Likewise, the second processor 42 is configured to receive data transmitted by the hands-free system 20. The data is transmitted to the electronic mobile device 14 over the wireless network 16. The second processor 42 processes the information so as to respond to the phone call or text message as directed by the driver. For example, the second processor 42 may be configured to process an audible response detected by the first microphone 38 so as to respond to a phone call. In another example, the user may respond to a text message verbally. The second processor 42 processes the verbal response so as to translate the verbal response into a text message wherein the second processor 42 transmits the text message to the texter through the antenna 18. Any such communication protocol currently known and used may be adaptable for use herein.

The executable software program 28 may be stored locally in the data storage component 34 of the first computing device 24. The executable software program 28 includes a set of instructions for the second processor 42 to execute. The executable software program 28 may include instructions to execute the executable software program 28 when the electronic mobile device 14 is paired with the wireless network 16. The set of instructions include logic for disabling the first tactile input 12 and lock the display screen of the electronic mobile device 14 when the electronic mobile device 14 is paired with the wireless network 16. The set of instructions may further include muting the second speaker 46. Thus, sounds from the electronic mobile device 14 are muted so as to not distract the driver.

The executable software program 28 may be further configured to display a fixed indicia 48 onto the entire touch screen display 50. An exemplary embodiment of the fixed indicia 48 is shown in FIG. 2, wherein a solid background is displayed and the text "IN-VEHICLE USE" is written on top of the background. The executable software program 28 is further configured to prevent the touch screen display 50 from responding to any tactile input so as to force all responses to incoming texts and phone calls through the automotive vehicle 100 hands-free system 20. Thus, the vehicle electronic mobile device system 10 helps drivers maintain their attention on the road.

The executable software program 28 may be further configured to display an active indicia 52. The active indicia 52 may occupy a predetermined area of the touch screen display 50 of the electronic mobile device 14. The active indicia 52 may be programmed so as to contact an emergency service provided. The active indicia 52 can occupy a portion of the touch screen display 50, and may be colored differently so as to stand out. The active indicia 52 may also be represented by a sign indicative of an emergency service provider such as "911".

The executable software program 28 may be stored on the data storage component 34 and transmitted to the electronic mobile device 14 over the wireless network 16. In one embodiment, the first processor 26 may transmit the executable software program 28 to the electronic mobile device 14 over the wireless network 16 when the electronic mobile device 14 is paired to the first wireless transceiver 22. The first processor 26 may be configured to provide access to the wireless network 16 on a condition that the executable software program 28 is downloaded onto the electronic mobile device 14.

In another embodiment, the vehicle electronic mobile device system 10 is further configured to determine or receive a vehicle operating condition. The executable software program 28 is configured to disable the first tactile input 12 when the electronic mobile device 14 is paired to the automotive vehicle 100 and the automotive vehicle 100 is in an operating condition. The first processor 26 may contain logic which is configured to process various vehicle data so as to determine a vehicle operating condition. As used herein, a vehicle operating condition is a state of the automotive vehicle 100 which indicates that the automotive vehicle 100 is operating. For instance, the vehicle operating condition may be simply that the automotive vehicle transmission is in drive or reverse.

In another example, the vehicle operating condition may simply be when the ignition is turned on. The first processor 26 is configured to request vehicle information from various control units embedded in the automotive vehicle 100. For instance, the state of the transmission may be received from an engine control unit 54. The engine control unit 54 may transmit to the state of the vehicle transmission or the actuation of the ignition to the electronic mobile device 14 over the wireless network 16. The first processor 26 may process other vehicle information to determine that the automotive vehicle 100 is in as operating condition. For instance, a body control unit 56 may transmit to the first processor 26 data indicating the state of the doors. The first processor 26 processes such data to determine if the automotive vehicle 100 is in a vehicle operating condition. An exemplary vehicle operating condition may be determined when the ignition switch is actuated and the doors are locked.

In one embodiment, the vehicle operating condition may be determined by the second processor 42. The second processor 42 receives vehicle data from sensors and/or control units embedded in the automotive vehicle 100. The data is transmitted to the second processor 42 over the wireless network 16. For instance, the engine control unit 54 may transmit to the first processor 26 data indicating the state of the vehicle information. The body control unit 56 may transmit to the first processor 26 data indicating the state of the doors. The second processor 42 processes such data to determine if the automotive vehicle 100 is in a vehicle operating condition.

The vehicle electronic mobile device system 10 may further include a language protocol 58 configured to execute at least one of a plurality of functions of the electronic mobile device 14. The language protocol 58 may be a list of word commands receive through the hands-free system 20 and processed by the second processor 42 so as to execute functions of the electronic mobile device 14. For instance, the language protocol 58 may include the commands "call", "text", "find", "answer call" and "answer text". Such commands may be picked up by the first microphone 38 of the hands-free system 20 and transmitted to the second processor 42 over the network. For example, the command "call John Smith" may initiate a scan of the memory storage component of the electronic mobile device 14 for a contact named "John Smith" and the second processor 42 calls "John Smith". The phone call communication is handled over the hands-free system 20, wherein the touch screen display is locked with the fixed indicia 48, and perhaps the active indicia 52 as the case may be. Accordingly, texting and phone calls may only be handled through the hands-free system 20.

Figure 3:
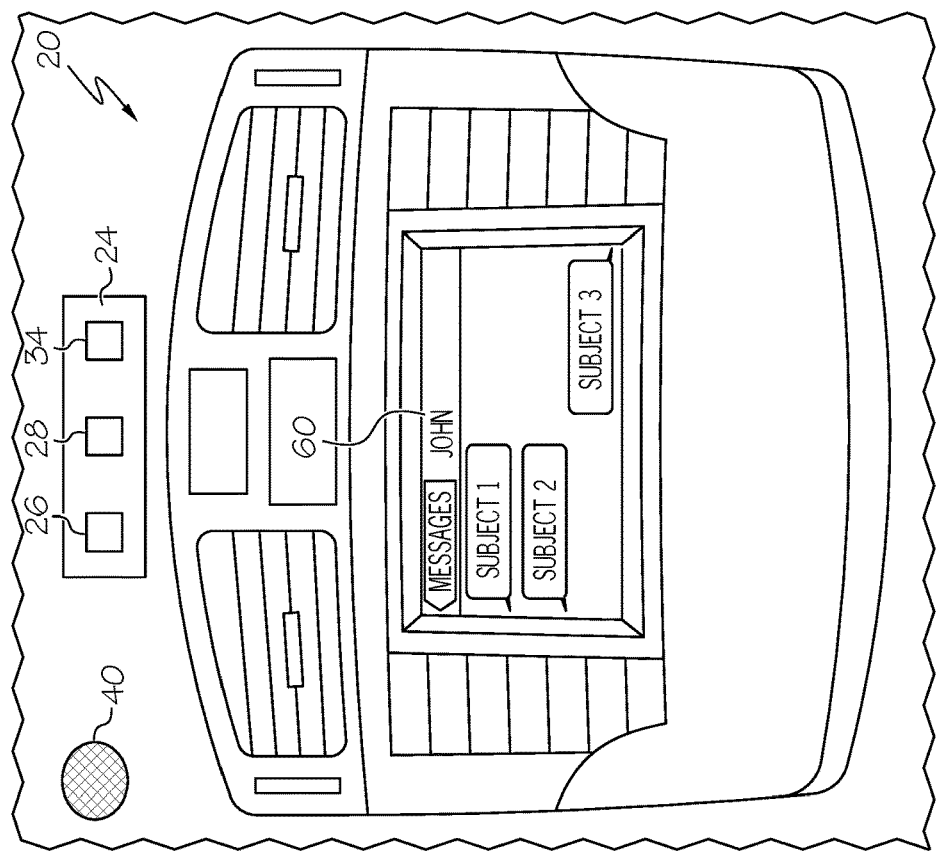
FIG. 3 schematically depicts operation of the vehicle electronic mobile device system.
Figure 3:
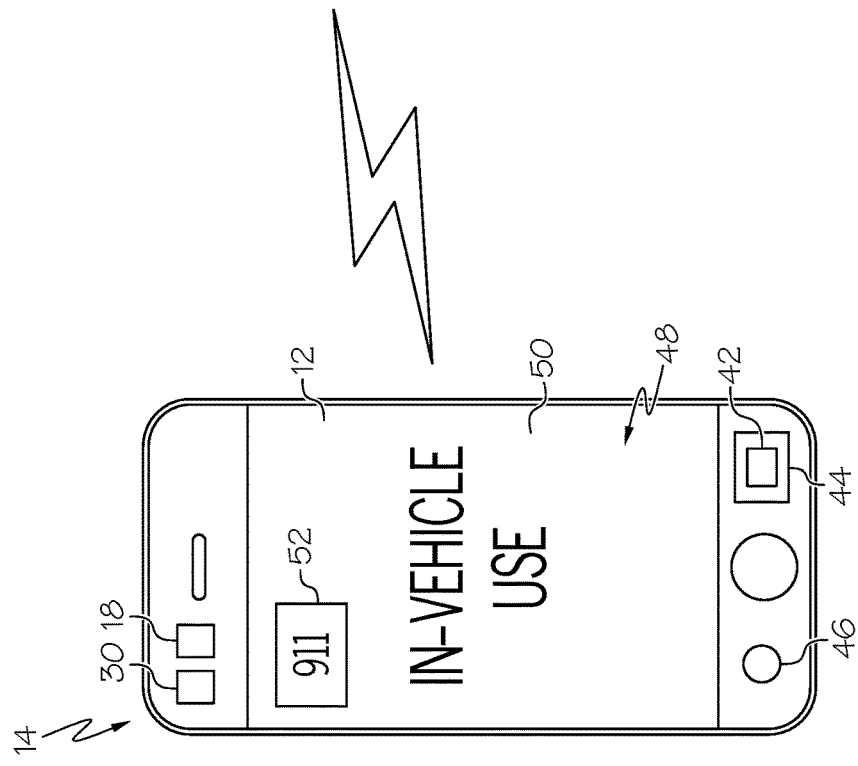

With reference now to FIG. 3, an exemplary operation of the vehicle electronic mobile device system 10 is provided. The executable software is stored in the first computing device 24 residing locally within the automotive vehicle 100 having the first processor 26 and the hands-free system 20. The first wireless transceiver 22 transmits the pairing signal 32 and waits for the electronic mobile device 14 on the list of profiles of electronic mobile devices 14 to request to pair with the network. It should be appreciated that any electronic mobile device 14 may be added to the plurality of profiles subject to the electronic mobile device 14 undergoing established pairing procedures. In the instance of a first time access to the vehicle electronic mobile device system 10, the executable software program 28 is transmitted to the electronic mobile device 14 after the electronic mobile device 14 has been paired. As a condition of being paired, the first processor 26 confirms that the executable software program 28 has been downloaded onto the electronic mobile device 14.

Upon confirmation that the executable software program 28 has been downloaded onto the electronic mobile device 14, the executable software program 28 may lock the touch screen display 50 by placing a fixed indicia 48 over the entire touch screen display, or locking a keyboard where available. The executable software program 28 may lock the touch screen display when the electronic mobile device 14 is paired, or when the electronic mobile device 14 is paired and a vehicle operating condition is detected or submitted. Accordingly, the vehicle electronic mobile device system 10 discourages users from handling the electronic mobile device 14 by disabling the first tactile input 12 of the electronic mobile device 14. However, as the other functions of the electronic mobile device 14 are enabled, functions such as texting and phone calls may be actuated by use of the hands-free system 20.

FIG. 3 shows an embodiment of the vehicle electronic mobile device system 10 wherein text messages received by the electronic mobile device 14 are displayed on the head unit 60 of the automotive vehicle 100. In such an embodiment, the first tactile input 12 remains inoperable as indicated by the fixed indicia 48 displayed on the touch screen display 50. The text messages may be read over the first speaker 40 and responses made over the hands-free system 20 are also displayed on the head unit 60.

The above-described vehicle electronic mobile device systems prevents the driver from handling an electronic mobile device while the vehicle is in an operating condition, but allows others within the vehicle to freely use their electronic mobile device. Further, as the system is simple in implementation as the system disables only the electronic mobile device which is paired to the hands-free communication system. Accordingly, responding to phone calls and text messages from the driver may be accomplished without handling the electronic mobile device.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle electronic mobile device system for promoting driver awareness for use in an automotive vehicle having a first wireless transceiver, a computing device having a first processor and a hands-free system, the first wireless transceiver providing short range communications, the first processor configured to transmit and process signals received by the first wireless transceiver, the first processor transmitting a processed signal to the hands-free system, the vehicle electronic mobile device system comprising:
   an electronic mobile device having a tactile input, a second wireless transceiver and a second processor, the second processor receiving a pairing signal; and
   an executable software program configured to disable the tactile input as soon as the electronic mobile device is paired to the automotive vehicle and when at least one of a plurality of predetermined vehicle conditions is met;

wherein the executable software program is sent to the electronic mobile device using the first wireless transceiver as a condition for pairing the electronic mobile device to the automotive vehicle;

wherein the first processor confirms that the executable software program is downloaded onto the electronic mobile device as a condition to remain paired to the automotive vehicle.

2. The vehicle electronic mobile device system of claim 1, wherein the first wireless transceiver and the second wireless transceiver are a Bluetooth transceiver.

3. The vehicle electronic mobile device system of claim 1, wherein the tactile input is a touch screen.

4. The vehicle electronic mobile device system of claim 3, wherein the executable software program displays a fixed indicia over an entirety of the touch screen.

5. The vehicle electronic mobile device system of claim 4, wherein the executable software program displays an active indicia, the active indicia configured to be actuated so as to enable communications with an emergency service provider.

6. The vehicle electronic mobile device system of claim 1, wherein the executable software program includes a language protocol, the language protocol configured to execute at least one of a plurality of functions of the electronic mobile device.

7. The vehicle electronic mobile device system of claim 6, wherein plurality of functions include texting and emailing.

8. The vehicle electronic mobile device system of claim 1, wherein the executable software program is further configured to receive a vehicle condition from the automotive vehicle through the second wireless transceiver, the vehicle condition being a state of operation of the automotive vehicle.

9. A vehicle electronic mobile device system for promoting driver awareness for use in an automotive vehicle, the vehicle electronic mobile device system comprising:

a first wireless transceiver providing short range communications;

a computing device having a first processor, the first processor configured to actuate the first wireless transceiver so as to transmit a pairing signal, the first processor processing signals received by the first wireless transceiver;

an electronic mobile device having a tactile input, a second wireless transceiver and a second processor, the second processor configured to process the pairing signal and transmit a profile so as to create a wireless connection between the first wireless transceiver and the second wireless transceiver;

a hands-free system transmitting and receiving data to and from the electronic mobile device over the wireless connection; and an executable software program configured to disable the tactile input as soon as the electronic mobile device is paired to the automotive vehicle and when at least one of a plurality of predetermined vehicle conditions is met;

wherein the executable software program is sent to the electronic mobile device using the first wireless transceiver as a condition for pairing the electronic mobile device to the automotive vehicle;

wherein the first processor confirms that the executable software program is downloaded onto the electronic mobile device as a condition to remain paired to the automotive vehicle.

10. The vehicle electronic mobile device system of claim 9, wherein the computing device further includes a data storage component, the data storage component configured to store a plurality of profiles, each of the plurality of profiles being associated with one of a plurality of electronic mobile devices.

11. The vehicle electronic mobile device system of claim 10, wherein the executable software program is stored in the data storage component, the first processor transmitting the executable software program onto the electronic mobile device over the wireless connection, the first processor configured to prevent a transmission of data over the wireless connection until the second processor actuates the executable software program.

12. The vehicle electronic mobile device system of claim 9, wherein the first wireless transceiver and the second wireless transceiver are a Bluetooth transceiver.

13. The vehicle electronic mobile device system of claim 9, wherein the tactile input is a touch screen.

14. The vehicle electronic mobile device system of claim 13, wherein the executable software program displays a fixed indicia over an entirety of the touch screen.

15. The vehicle electronic mobile device system of claim 14, wherein the executable software program displays an active indicia over the fixed indicia, the active indicia configured to be actuated so as to enable communications with an emergency service provider.

16. The vehicle electronic mobile device system of claim 9, wherein the executable software program includes a language protocol, the language protocol configured to execute at least one of a plurality of functions of the electronic mobile device.

17. The vehicle electronic mobile device system of claim 16, wherein plurality of functions include texting and emailing.

18. The vehicle electronic mobile device system of claim 9, wherein the executable software program is further configured to receive a vehicle condition from the automotive vehicle through the second wireless transceiver, the vehicle condition being a state of operation of the automotive vehicle.

* * * * *